(12) United States Patent
Huang et al.

(10) Patent No.: US 9,903,949 B2
(45) Date of Patent: Feb. 27, 2018

(54) RADIO-FREQUENCY SYSTEM

(71) Applicant: Wistron NeWeb Corporation, Hsinchu (TW)

(72) Inventors: Guo-Shu Huang, Hsinchu (TW); Hsin-Lung Hsiao, Hsinchu (TW)

(73) Assignee: Wistron NeWeb Corporation, Hsinchu (TW)

(*) Notice: Subject to any disclaimer, the term of this patent is extended or adjusted under 35 U.S.C. 154(b) by 388 days.

(21) Appl. No.: 14/691,547

(22) Filed: Apr. 20, 2015

(65) Prior Publication Data

US 2015/0323652 A1 Nov. 12, 2015

(30) Foreign Application Priority Data

May 8, 2014 (TW) .............................. 103116434 A

(51) Int. Cl.
| | | |
|---|---|---|
| *G01S 13/93* | (2006.01) | |
| *G01S 7/42* | (2006.01) | |
| *G01S 7/03* | (2006.01) | |
| *H01Q 23/00* | (2006.01) | |
| *G01S 7/00* | (2006.01) | |
| *H01Q 21/00* | (2006.01) | |
| *G01S 13/00* | (2006.01) | |

(52) U.S. Cl.
CPC ............ *G01S 13/931* (2013.01); *G01S 7/006* (2013.01); *G01S 7/03* (2013.01); *G01S 7/42* (2013.01); *H01Q 21/0006* (2013.01); *H01Q 23/00* (2013.01)

(58) Field of Classification Search
CPC . G01S 7/003; G01S 7/006; G01S 7/02; G01S 7/03; G01S 7/42; G01S 13/88; G01S 13/93; G01S 13/931; G01S 7/032; H01Q 21/0006; H01Q 23/00; H01Q 21/0025
See application file for complete search history.

(56) References Cited

U.S. PATENT DOCUMENTS

| | | | | |
|---|---|---|---|---|
| 5,008,678 | A | * | 4/1991 | Herman ................ G01S 13/931 |
| 5,115,245 | A | * | 5/1992 | Wen ...................... G01S 7/032 |
| | | | | 342/175 |
| 7,109,922 | B2 | * | 9/2006 | Shmuel ............. H01Q 21/0025 |
| | | | | 342/70 |

(Continued)

FOREIGN PATENT DOCUMENTS

EP 0733913 A2 * 9/1996 ......... H01Q 21/0006

*Primary Examiner* — Bernarr E Gregory
(74) *Attorney, Agent, or Firm* — Winston Hsu

(57) ABSTRACT

A radio-frequency (RF) system includes a substrate; a plurality of antenna strings, formed on a first plane of the substrate, each comprising a plurality of radiating units connected in a sequence, wherein the plurality of antenna strings are classified into a first group and a second group; a plurality of wires, formed on a second plane of the substrate, for transmitting RF signals; a plurality of connecting units, disposed in the substrate, for coupling the plurality of wires and antenna strings of the second group; a first RF processing module, for transmitting or receiving RF signals via antenna strings of the first group, and a second RF processing module, for coupling to the antenna strings of the second group through the plurality of wires and the plurality of connecting units, so as to transmit or receive RF signals via the antenna strings of the second group.

5 Claims, 9 Drawing Sheets

(56) References Cited

U.S. PATENT DOCUMENTS

| | | | | |
|---|---|---|---|---|
| 7,733,265 B2* | 6/2010 | Margomenos | .......... | G01S 7/032 |
| | | | | 342/175 |
| 7,786,928 B2* | 8/2010 | Hansen | .................. | G01S 7/032 |
| | | | | 342/11 |
| 7,830,301 B2* | 11/2010 | Margomenos | ............ | G01S 7/03 |
| | | | | 342/175 |
| 8,022,861 B2* | 9/2011 | Margomenos | .......... | G01S 7/032 |
| | | | | 342/175 |
| 8,731,483 B2* | 5/2014 | Holter | ................ | H01Q 21/0006 |
| 2002/0190891 A1* | 12/2002 | Viana | ...................... | G01S 7/032 |
| | | | | 342/27 |
| 2003/0016162 A1* | 1/2003 | Sasada | ...................... | G01S 7/03 |
| | | | | 342/70 |

* cited by examiner

RADIO-FREQUENCY SYSTEM

BACKGROUND OF THE INVENTION

1. Field of the Invention

The present invention relates to a radio-frequency (RF) system, and more particularly, to an RF system capable of providing additional transmitting and receiving capabilities without substantially enlarging disposal area.

2. Description of the Prior Art

An array antenna is an antenna system composed of a plurality of identical antennas arranged in accordance with a specific rule. Through proper arrangement of antenna element of the array antenna, a specific radiation pattern is achieved to concentrate a main beam at a specific direction to transmit signals. For example, for vehicle radar systems, the array antenna is configured to perform 2-dimensional sensing on horizontal direction. However, in practical applications, the 2-dimensional sensing over only horizontal direction may receive reflections from objects (such as notice boards, traffic lights, bridges, buildings, etc.) which are higher than a horizontal plane. Due to hardware limitation, false alarm is usually caused and system performance is degraded. In such a situation, if the vehicle radar system provides an RF system with a three dimensional scanning function to sense over both horizontal direction and vertical direction simultaneously, reflections from horizontal direction and vertical direction are more distinguishable, such that system reliability is enhanced and false alarm rate is further reduced.

Traditionally, an intuitive way to obtain sensing capability on different directions is to deploy another set of array antennas, and arrange the array antennas so as to sense over vertical direction. However, vehicle radar systems utilize wireless signal transceivers disposed inside vehicle bumpers or grills for ranging and information exchange applications. Since shock-absorbing Styrofoam or glass fibers are usually disposed inside the vehicle bumpers, the available space is limited. It is hard to accommodate another set of array antennas. Furthermore, if the vehicle radar systems are produced for sales of after-market, i.e. vendors for the radar systems do not participate in decision-making of materials and thickness of the bumpers, in such a condition, design requirements for the array antenna gain, the area and the radiation patterns become stricter for adapting to different cars.

Therefore, how to adequately increase sensing directions or sensing range of the array antenna without substantially enlarging the disposal area of the array antenna is a significant objective in the field.

SUMMARY OF THE INVENTION

It is therefore a primary objective of the present invention to provide an RF system to increase sensing range of the array antenna without substantially enlarging the disposal area.

An embodiment of the present invention discloses a radio-frequency (RF) system, comprising a substrate, comprising a first plane and a second plane; a plurality of antenna strings, formed on the first plane of the substrate, each comprising a plurality of radiating units connected in a sequence, wherein the plurality of antenna strings are classified into a first group and a second group; a plurality of wires, formed on the second plane of the substrate, for transmitting RF signals; a plurality of connecting units, disposed in the substrate, for coupling the plurality of wires and antenna strings of the second group within the plurality of antenna strings; a first RF processing module, coupled to antenna strings of the first group within the plurality of antenna strings, for transmitting or receiving RF signals via the antenna strings of the first group; and a second RF processing module, coupled to the plurality of wires, for coupling to the antenna strings of the second group through the plurality of wires and the plurality of connecting units, so as to transmit or receive RF signals via the antenna strings of the second group; wherein when the first RF processing module transmits or receives RF signals via the antenna strings of the first group, a first electric field generated by the antenna strings of the first group extends toward a first direction, and a second electric field generated by the antenna strings of the second group extends toward a second direction different from the first direction; wherein at least an antenna string of the plurality of antenna strings belong to both the first group and the second group.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
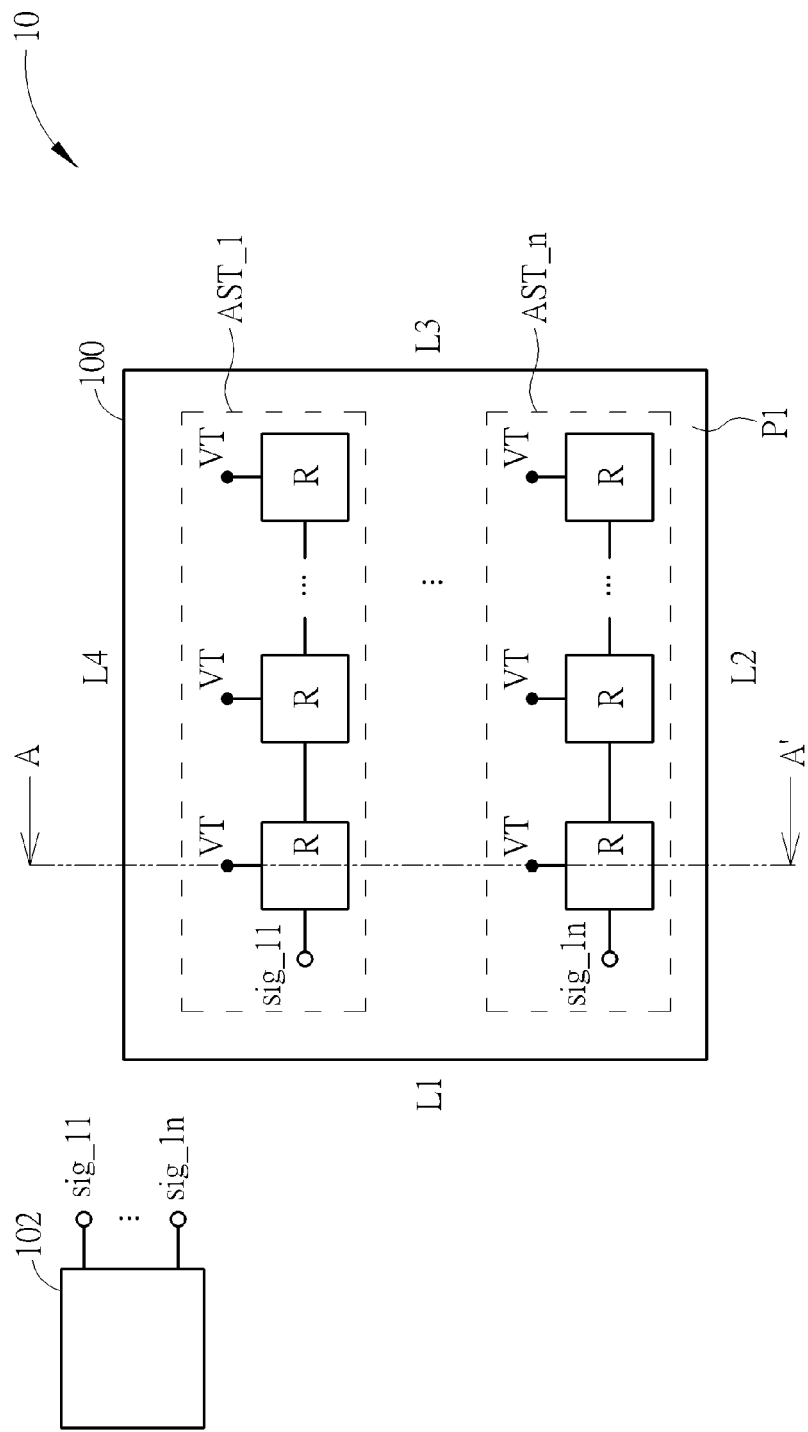
FIGS. 1A and 1B are schematic diagrams of a first plane and a second plane of a radio-frequency (RF) system according to an embodiment of the present invention.
Figure 1B:
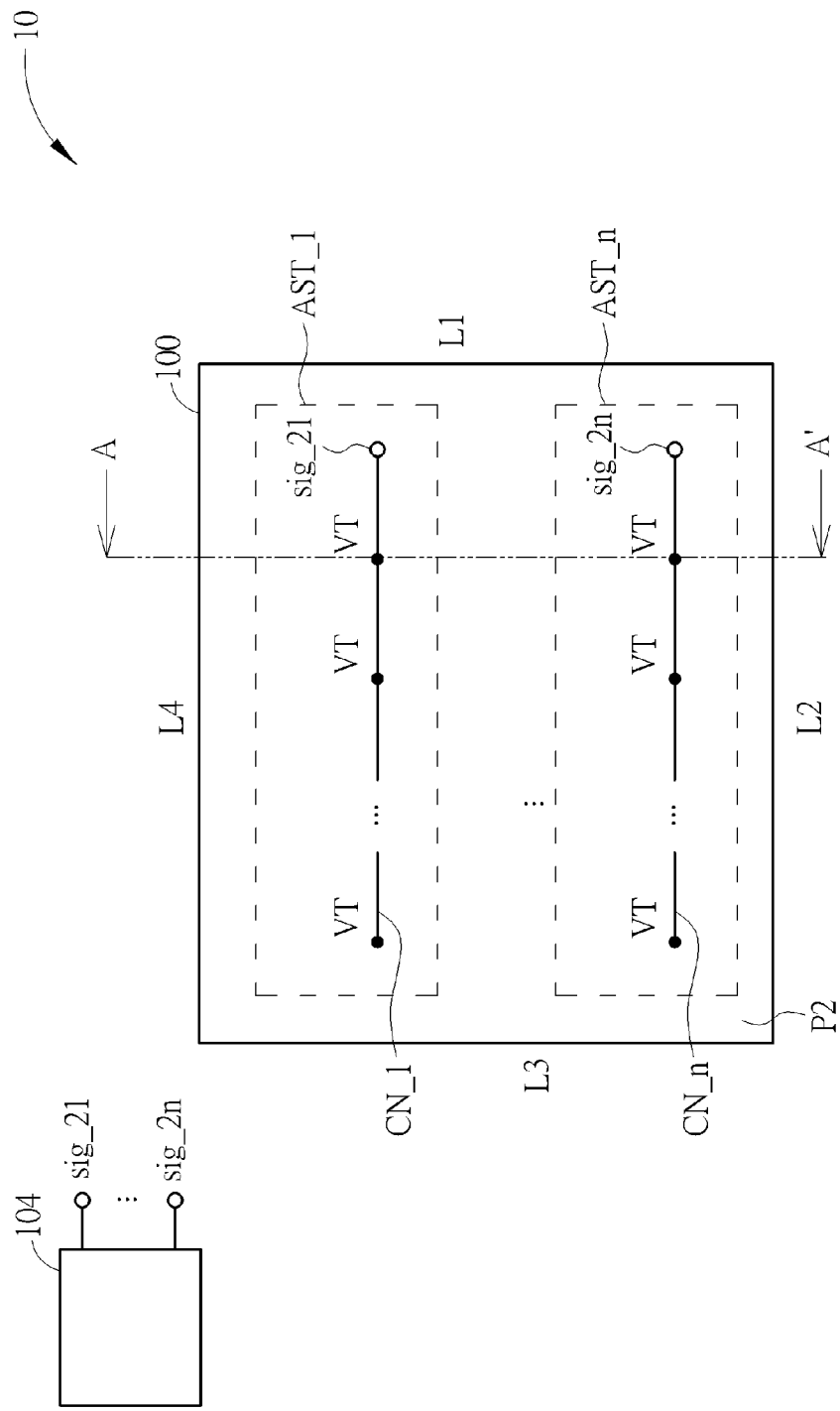
Figure 1C:
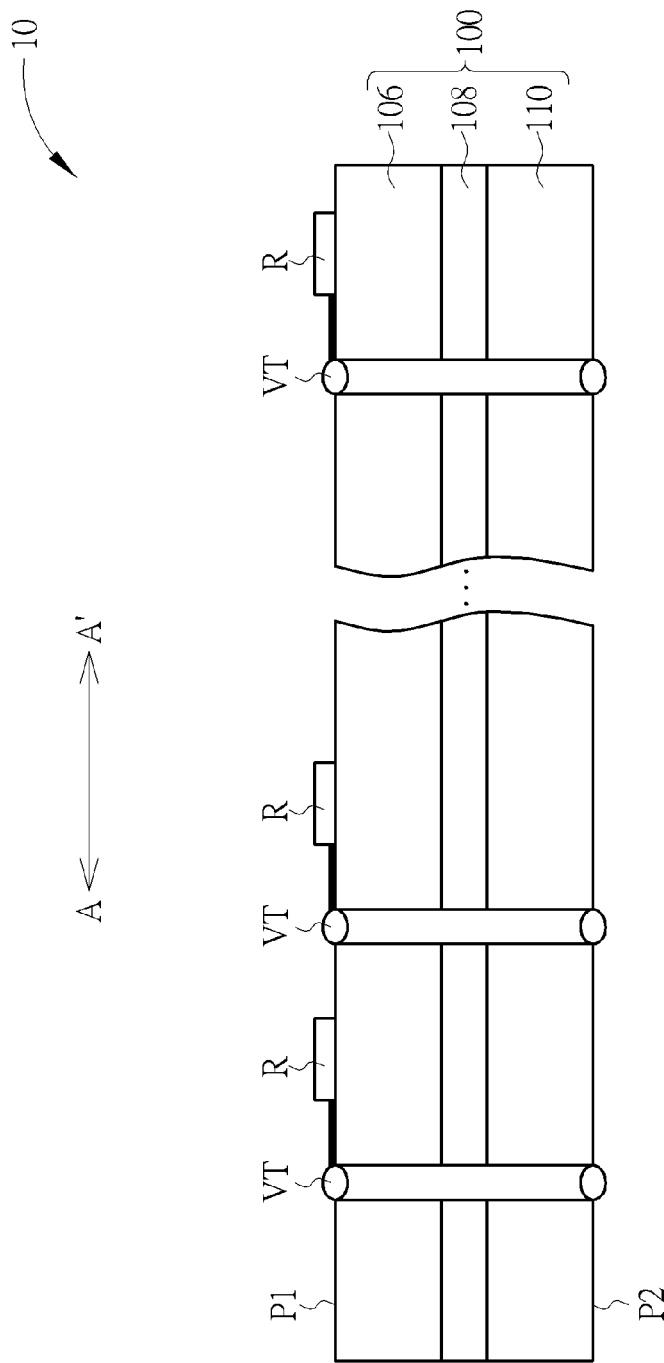
FIG. 1C is a sectional side view of FIG. 1A.

Please refer to FIGS. 1A to 1C. FIGS. 1A and 1B are schematic diagrams of a first plane P1 and a second plane P2 of a radio-frequency (RF) system 10 according to an embodiment of the present invention. FIG. 1C is a sectional side view along with a line A-A' in FIG. 1A. The RF system 10 may be a microwave transceiving network of a radar system such as a vehicle array antenna, and not limited herein. The RF system 10 comprises a substrate 100, antenna strings AST_1-AST_n, wires CN_1-CN_n, connecting units VT, a first RF processing module 102 and a second RF processing module 104. For clarity, four sides L1-L4 are annotated for the substrate 100 in FIGS. 1A and 1B to distinguish the illustrated directions of the first plane P1 and the second plane P2. As shown in FIG. 1C, the first plane P1 and the second plane P2 are a top plane (or surface) and a bottom plane (or surface) of the substrate 100, respectively. Furthermore, the substrate 100 may be classified into an antenna substrate 106, a grounding layer 108 and a wire substrate 110. The antenna strings AST_1-AST_n are disposed on the first plane P1, the wires CN_1-CN_n are disposed on the second plane P2, and the connecting units VT penetrate through the substrate 100 to connect the antenna strings AST_1-AST_n and the wires CN_1-CN_n.

In detail, each of the antenna strings AST_1-AST_n comprises a plurality of radiation elements R connected in a sequence. The antenna strings AST_1-AST_n are coupled to the first RF processing module 102 through signal terminals sig_11-sig_1n, respectively. Thus, the first RF processing module 102 may transmit and receive RF signals through the antenna strings AST_1-AST_n. On the other hand, the wires CN_1-CN_n are coupled to the second RF processing module 104 through signal terminals sig_21-sig_2n, and coupled to the antenna strings AST_1-AST_n through the connecting units VT penetrating through the substrate 100. In such a situation, the second RF processing module 104 may be coupled to the antenna strings AST_1-AST_n through the wires CN_1-CN_n and the connecting units VT, so as to transmit and receive RF signals through the antenna strings AST_1-AST_n.

In short, the first RF processing module 102 and the second RF processing module 104 share the antenna strings AST_1-AST_n to perform transmission and reception of RF signals, so as to spare antenna layout space. In another perspective, the RF system 10 may be regarded as two RF processing systems. One RF processing system comprises the first RF processing module 102 and the antenna strings AST_1-AST_n, and the other RF processing system comprises the second RF processing module 104, the wires CN_1-CN_n, the connecting units VT and the antenna strings AST_1-AST_n.

Notably, the RF system 10 shown in FIG. 1A to 1C is an embodiment of the present invention. Those skilled in the art may make modification and alternation accordingly. For example, the wires CN_1-CN_n may be any kind of conductive lines utilized for passing the RF signals, and lengths, widths, shapes, material, etc., thereof may be adequately modified according to system requirements, which is within the scope of the present invention. Any of the wires CN_1-CN_n may be partitioned or implemented by one or more wires connected either in series or in parallel, which is also within the scope of the present invention. The connecting units VT are utilized for coupling the wires CN_1-CN_n and the antenna strings AST_1-AST_n. The connecting units VT may be implemented by via or coupling elements, and disposed locations, material, etc., of the connecting units VT may be adequately modified. In addition, the radiation elements R are utilized for transmitting and sensing RF signals, and sizes, shapes, material, etc., thereof may be adequately modified according to system requirements. Similarly, connecting methods between the adjacent radiation elements R (e.g., directly connected or coupling connected), lengths of connecting wires, or numbers of the radiation elements R may also be modified. For example, applicant has disclosed an antenna and derived array antennas in U.S. patent application Ser. No. 13/802,391, filed Mar. 13, 2013, now U.S. Pat. No. 9,214,729, which may be utilized to implement or replace the radiation elements R and the antenna strings AST_1-AST_n of the present invention.

In another perspective, in the RF system 10, as shown in FIGS. 1A and 1B, the first RF processing module 102 and the second RF processing module 104 are disposed independently. In practice, the first RF processing module 102 and the second RF processing module 104 may be respectively disposed on the first plane P1 and the second plane P2 of the substrate 100. Meanwhile, the first RF processing module 102 and the second RF processing module 104 represent different processing modules, which may comprise one or more receiving processing unit and transmission processing unit, so as to achieve multiple transmit or multiple receive operation. In addition, in the RF system 10, all the antenna strings AST_1-AST_n are shared by the first RF processing module 102 and the second RF processing module 104. Nevertheless, this is a feasible embodiment. In fact, in another embodiment, it may be an alternative that only a part of the antenna strings AST_1-AST_n are shared by the first RF processing module 102 and the second RF processing module 104. Furthermore, the first RF processing module 102 and the second RF processing module 104 process the RF signal transmitted and received by the antenna strings AST_1-AST_n directly, which means that each of the antenna strings AST_1-AST_n has the same weighting (or power). Nevertheless, if it is necessary to adjust the signal weightings of the antenna strings AST_1-AST_n, a power divider may be used to adjust power ratios of the antenna strings AST_1-AST_n.

Figure 2A:
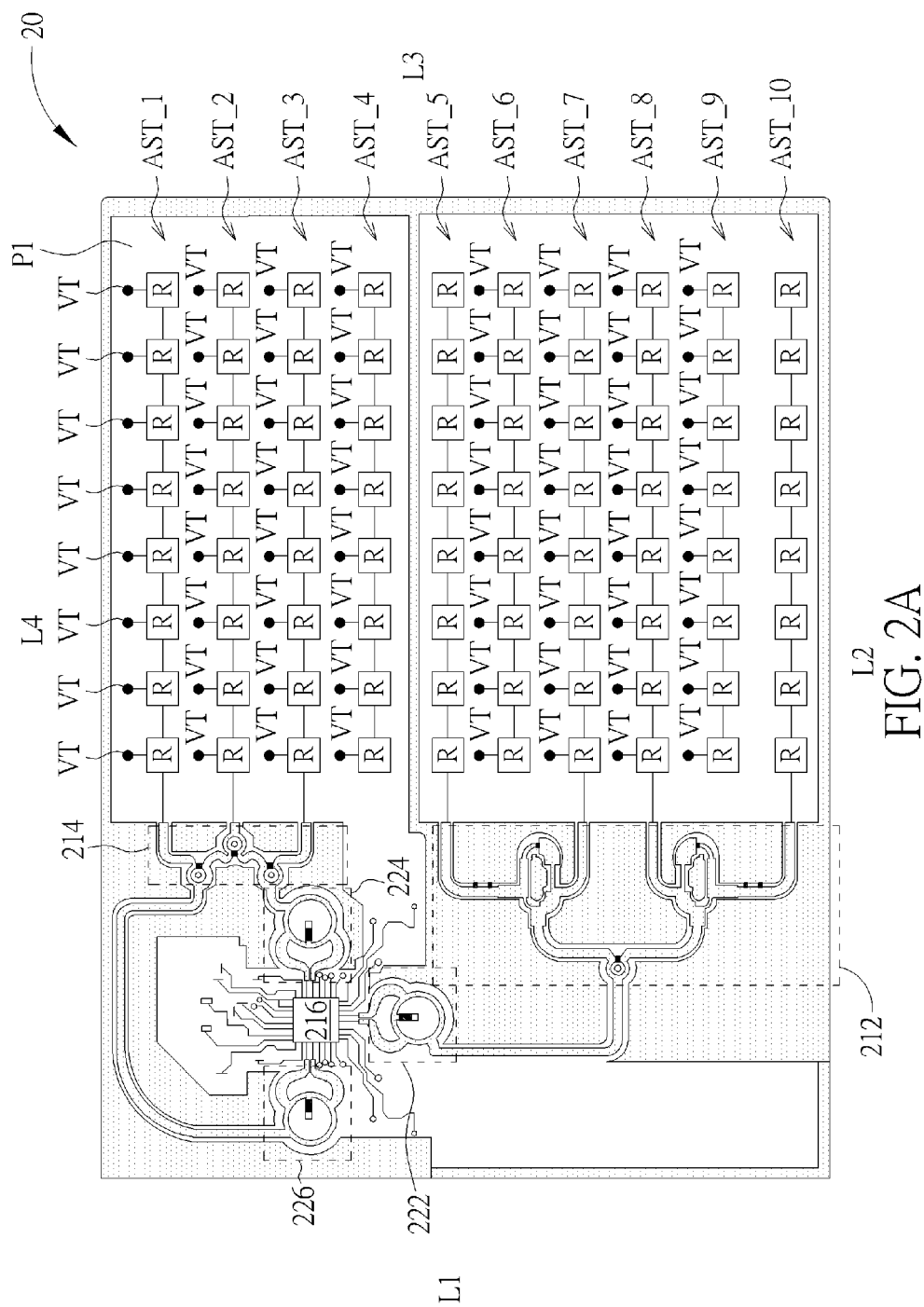
FIGS. 2A and 2B are schematic diagrams of a first plane and a second plane of an RF system according to an embodiment of the present invention.
Figure 2B:
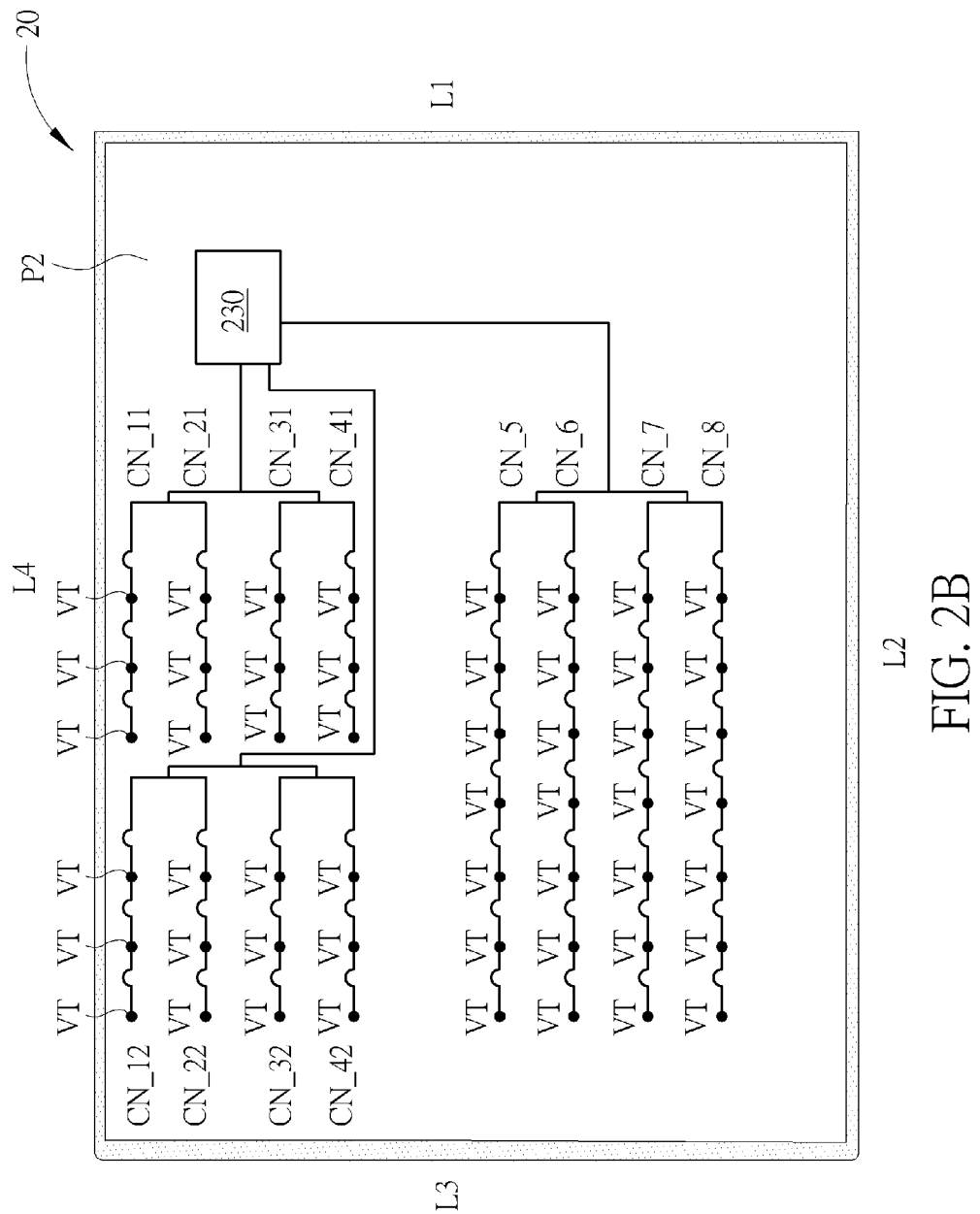

For example, please refer to FIGS. 2A and 2B, which are schematic diagrams of a first plane P1 and a second plane P2 of an RF system 20 according to an embodiment of the present invention. The RF system 20 is derived from the RF system 10 and has substantially the same structure as the RF system 10. For clarity, the four sides L1-L4 are also annotated in FIGS. 2A and 2B to distinguish the illustrated directions of the first plane P1 and the second plane P2. Different from the RF system 10, the RF system 20 comprises 10 antenna strings AST_1-AST_10, and each of the antenna strings AST_1-AST_10 comprises 8 radiation elements R. In addition to the antenna strings AST_1-AST_10 on the first plane P1 of the RF system 20, the RF system 20 further disposes a transmit power divider 212, a receive power divider 214, a first RF processing module 216 and ring-shaped couplers 222, 224, 226. Operational methods of the transmit power divider 212, the receive power divider 214 and the ring-shaped couplers 222, 224, 226 may be referred to the power divider and the RF transceiver system disclosed in U.S. patent application Ser. No. 13/866,013, filed Apr. 18, 2013, now U.S. Pat. No. 9,261,584. Moreover, the first RF processing module 216 is coupled to the antenna strings AST_1-AST_3, AST_5, AST_7, AST_8, AST_10 through the transmit power divider 212 and the receive power divider 214, to realize a one transmit two receive (1T2R) operation. In other words, RF signals received by the antenna strings AST_1-AST_3 are delivered to two receiving terminals of the first RF processing module 216 (wherein the antenna string AST_2 are shared by the two receiving terminals of the first RF processing module 216), and RF signals outputted by a transmitting terminal of the first RF processing module 216 are emitted to the air through the antenna strings AST_5, AST_7, AST_8, AST_10. For brevity, the antenna strings AST_1-AST_3, AST_5, AST_7, AST_8, AST_10, which are connected to the first RF processing module 216, are classified as a first group of antenna strings. On the other hand, the RF system 20 disposes a second RF processing module 230 and wires CN_11, CN_12, CN_21, CN_22, CN_31, CN_32, CN_41, CN_42, CN_5-CN_8 on the second plane P2, and is coupled to the antenna strings AST_1-AST_4, AST_6-AST_9 through the connecting units VT. For brevity, the antenna strings AST_1-AST_4, AST_6-AST_9, which are connected to the second RF processing module 230, are classified as a second group of antenna strings.

As can be seen from the above, the antenna strings AST_1-AST_3, AST_7, AST_8 belong to both the first group and the second group of antenna strings. In other words, the first RF processing module 216 and the second RF processing module 230 share a part of antenna strings within the antenna strings AST_1-AST_10 (i.e., AST_1-AST_3, AST_7, AST_8). In addition, the wires CN_11, CN_12 of the RF system 20 corresponds to two segments of the same antenna string AST_1, the wires CN_21, CN_22 corresponds to two segments of the same antenna string AST_2, the wires CN_31, CN_32 corresponds to two segments of the same antenna string AST_3, and the wires CN_41, CN_42 corresponds to two segments of the same antenna string AST_4. The wires CN_11, CN_21, CN_31, CN_41 are connected to the same receiving terminal of the second RF processing module 230, the wires CN_12, CN_22, CN_32, CN_42 are connected to another receiving terminal of the second RF processing module 230, and the wires CN_5-CN_8 are connected to a transmitting terminal of the second RF processing module 230. In other words, the second RF processing module 230 is coupled to the antenna strings AST_1-AST_4, AST_6-AST_9 through the wires CN_11, CN_12, CN_21, CN_22, CN_31, CN_32, CN_41, CN_42, CN_5-CN_8 and the connecting units VT, to realize the 1T2R operation.

Therefore, the first RF processing module 216 may realize the 1T2R operation through the antenna strings AST_1-AST_3, AST_5, AST_7, AST_8, AST_10, and the second RF processing module 230 may realize the 1T2R operation through the antenna strings AST_1-AST_4, AST_6-AST_9. In other words, the present invention utilizes the original 1T2R array antennas to achieve a two transmit four receive (2T4R) operation by using the sharing antenna strings. Required disposal space is spared, which is suitable for space-limited applications such as vehicle radar system.

Figure 3A:
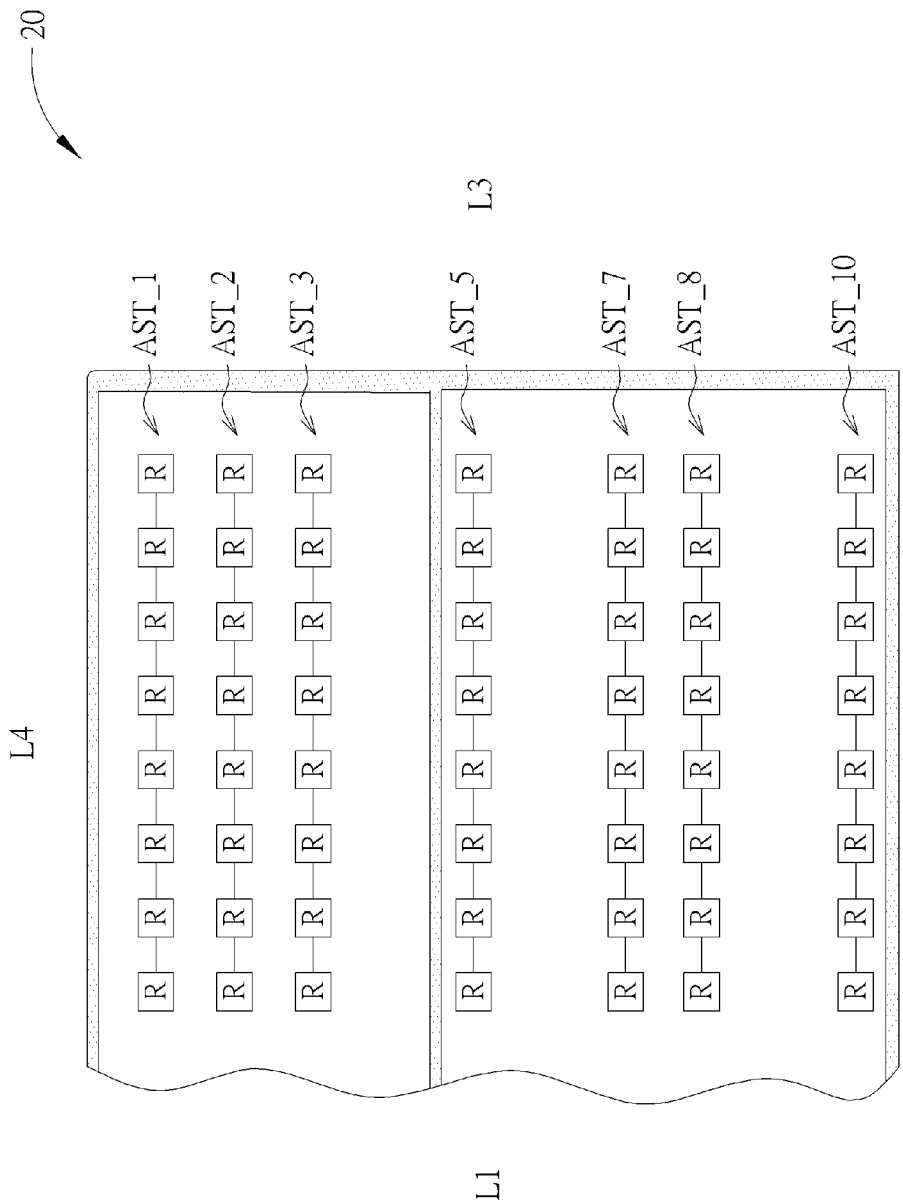
FIGS. 3A and 3B are schematic diagrams of connections of antenna strings when the RF system in FIG. 2A operates.
Figure 3B:
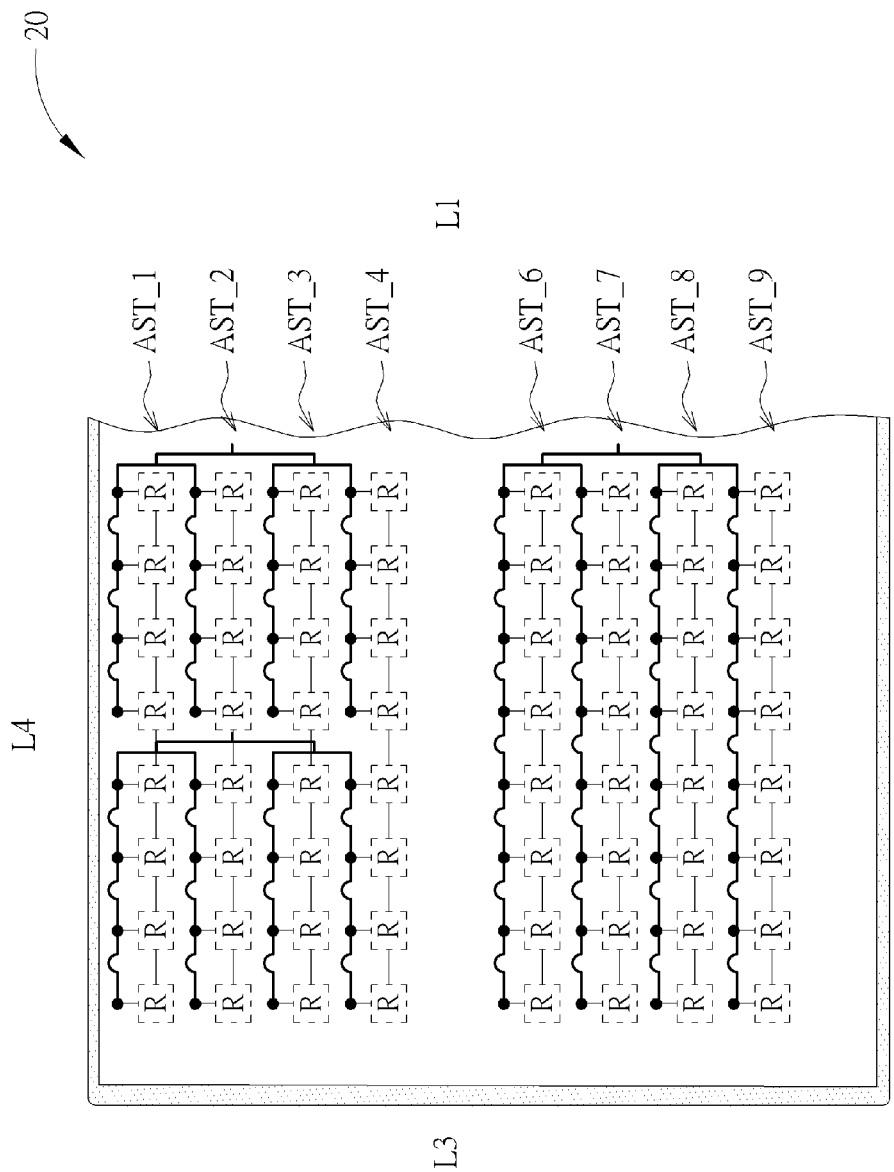

In addition, when the first RF processing module 216 performs the 1T2R operation, the radiation elements R of each antenna string of the antenna strings AST_1-AST_3, AST_5, AST_7, AST_8, AST_10 are connected in series. When the second RF processing module 230 performs the 1T2R operation, the radiation elements R of each antenna string of the antenna strings AST_1-AST_4, AST_6-AST_9 are connected in parallel. In such a situation, when the first RF processing module 216 and the second RF processing module 230 perform operations, the RF system 20 may generate different directions of polarization. Specifically, please refer to FIGS. 3A and 3B, which are schematic diagrams of connections of the antenna strings AST_1-AST_10 when the first RF processing module 216 and the second RF processing module 230 operate. Notably, FIGS. 3A and 3B are for illustrating the connections of the radiation elements R of the antenna strings AST_1-AST_10 under different operating conditions, notations of most components are ignored, and detail structures should be referred to FIGS. 2A and 2B. For example, FIG. 3A illustrates the connections of the antenna strings AST_1-AST_10 when the first RF processing module 216 operates. Since in such a situation, the first RF processing module 216 only utilizes the antenna strings AST_1-AST_3, AST_5, AST_7, AST_8, AST_10 to perform transmission and reception of RF signals, only the antenna strings AST_1-AST_3, AST_5, AST_7, AST_8, AST_10 are shown. Similarly, FIG. 3B illustrates the connections of the antenna strings AST_1-AST_10 when the second RF processing module 230 operates. Since in such a situation, the second RF processing module 230 only utilizes the antenna strings AST_1-AST_4, AST_6-AST_9 to perform transmission and reception of RF signals, only the antenna strings AST_1-AST_4, AST_6-AST_9 are shown. In addition, since the antenna strings AST_1-AST_4, AST_6-AST_9 and the wires CN_11, CN_12, CN_21, CN_22, CN_31, CN_32, CN_41, CN_42, CN_5-CN_8 are respectively located on the first plane P1 and the second plane P2, the antenna strings AST_1-AST_4, AST_6-AST_9 are represented in dashed lines in FIG. 3B.

Figure 4A:
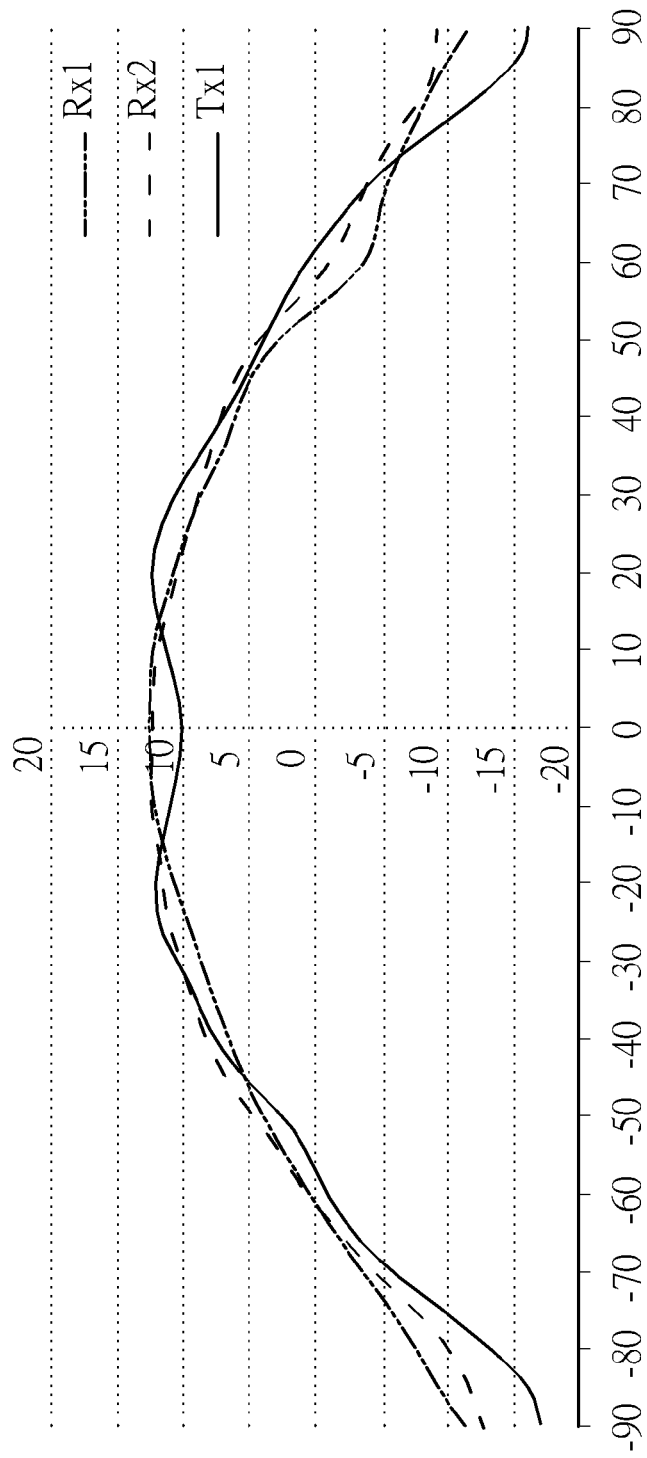
FIGS. 4A and 4B are schematic diagrams of antenna patterns of the RF system shown in FIG. 2A
Figure 4B:
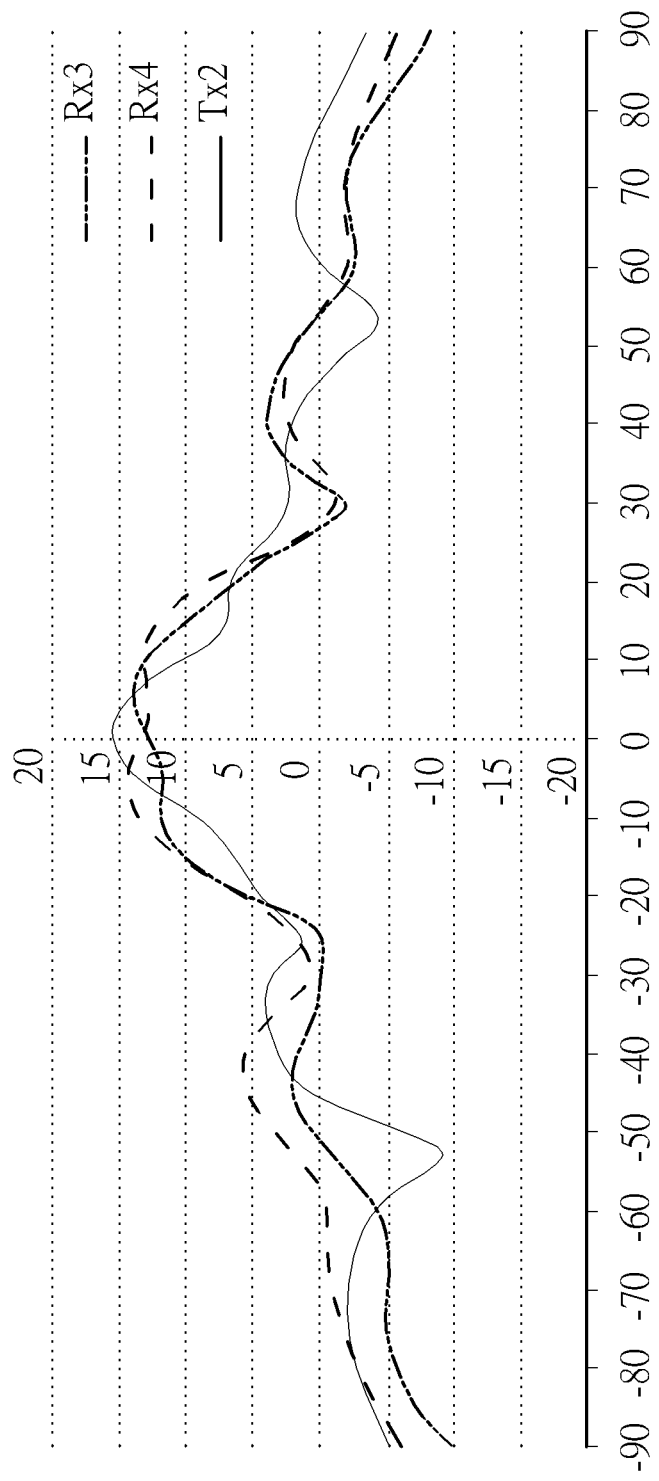

As can be seen by comparing FIGS. 3A and 3B, when the first RF processing module 216 and the second RF processing module 230 perform the 1T2R operation, the radiation elements R are connected in series and parallel, respectively, such that different directions of polarization are generated. For example, through proper arrangements, if the RF system 20 presents horizontal polarization when the first RF processing module 216 operates, i.e., a first electric field generated by the antenna strings AST_1-AST_3, AST_5, AST_7, AST_8, AST_10 extends toward horizontal direction, then the RF system 20 presents vertical polarization when the second RF processing module 230 operates, i.e., a second electric field generated by the antenna strings AST_1-AST_4, AST_6-AST_9 extends toward vertical direction. Antenna patterns under the operation conditions stated in the above may be further referred to FIGS. 4A and 4B. FIG. 4A is a diagram of a two-dimensional (2D) antenna pattern in horizontal direction when the first RF processing module 216 operates. Curves Rx1, Rx2 represent receiving patterns of the antenna strings AST_1-AST_3, and a curve Tx1 represents a transmitting pattern of the antenna strings AST_5, AST_7, AST_8, AST_10. FIG. 4B is a diagram of a 2D antenna pattern in vertical direction when the second RF processing module 230 operates. Curves Rx3, Rx4 represent receiving patterns of the antenna strings AST_1-AST_4, and a curve Tx2 represents a transmitting pattern of the antenna strings AST_6-AST_9.

As can be seen from FIGS. 4A and 4B, the RF system 20 may produce both horizontal polarization and vertical polarization. In such a situation, if the RF system 20 is applied in vehicle radar systems, reflections from horizontal direction and vertical direction are distinguishable since the RF system 20 provides a three dimensional scanning function which is capable of scanning horizontally and vertically, false alarm caused by reflections from objects higher than the horizontal plane is avoided, and system performance and system reliability are further enhanced. Furthermore, the 1T2R operation provided by the second RF processing module 230 performs vertical scanning. In addition, the 1T2R operation of the second RF processing module 230 may also perform data transmission in other embodiments, for example, to realize vehicle to vehicle communication, vehicle to system communication, etc., and not limited herein.

Notably, the RF system 20 is derived from the RF system 10, and adopts the power divider disclosed in U.S. patent application Ser. No. 13/866,013. However, this is a feasible embodiment. Those skilled in the art may make modification and alternation accordingly. For example, in U.S. patent application Ser. No. 13/866,013, filed Apr. 18, 2013, now U.S. Pat. No. 9,261,584, the radiation elements within the same sub-array antennas have different sizes. The same concept or derived variations may be applied in the present invention. In another perspective, the power divider applied to the present invention is not limited to the one disclosed in U.S. patent application Ser. No. 13/866,013. For example, applicant further discloses a power divider and an RF device in U.S. patent application Ser. No. 14/054,841, which may be also applied to the embodiments of the present invention after proper modifications, and not limited herein.

The present invention utilizes the sharing antenna strings to obtain extra RF signal transmitting and receiving paths without substantially enlarging circuit area, and reduces the required disposal space. In addition, the wires (CN_1-CN_n) and the antenna strings (AST_1-AST_n) of the present invention are disposed in two plane of the substrate (100), interference between the wires and the antenna strings is reduced, and performance under two operations is further enhanced.

In the conventional way, an extra set of array antennas is required for enhancing sensing capability of vehicle radar systems, such that disposal area is substantially increased. In comparison, the present invention disposes the wires on the opposite plane of the antenna strings, and connects the antenna strings using the connecting units. The present invention utilizes the sharing antenna strings to obtain extra transmitting and receiving capability without substantially enlarging disposal area. The extra transmitting and receiving operation may be used for data transmission, in addition to providing scanning in different directions.

In summary, the present invention utilizes the sharing antenna strings to provide additional scanning in different directions without substantially enlarging the disposal area, so as to avoid false alarm caused by reflections from objects which are higher than the horizontal plane, and to enhance system performance and system reliability. The additional transmitting and receiving capability may be used to realize data transmission such as vehicle to vehicle communication, vehicle to system communication, etc., to increase functionalities of the vehicle radar systems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) system, comprising:
   a substrate, comprising a first plane and a second plane;
   a plurality of radiating units, formed on the first plane of the substrate, and forming a plurality of antenna strings, wherein radiating units of each antenna string are connected in a sequence, and the plurality of antenna strings are classified into a first group and a second group;
   a plurality of conductive lines, formed on the second plane of the substrate, for transmitting RF signals;
   a plurality of connecting units, disposed in the substrate, for coupling the plurality of conductive lines and antenna strings of the second group within the plurality of antenna strings;
   a first RF processing module, coupled to antenna strings of the first group within the plurality of antenna strings, for transmitting or receiving RF signals via the antenna strings of the first group; and
   a second RF processing module, coupled to the plurality of conductive lines, for coupling to the antenna strings of the second group through the plurality of conductive lines and the plurality of connecting units, so as to transmit or receive RF signals via the antenna strings of the second group;
   wherein when the first RF processing module transmits RF signals via the antenna strings of the first group, a first electric field generated by the antenna strings of the first group extends toward a first direction, and when the second RF processing module transmits RF signals via the antenna strings of the second group, a second electric field generated by the antenna strings of the second group extends toward a second direction different from the first direction;
   wherein at least an antenna string of the plurality of antenna strings belong to both the first group and the second group.

2. The RF system of claim 1, wherein the first RF processing module is formed on the first plane of the substrate.

3. The RF system of claim 1, wherein the second RF processing module is formed on the second plane of the substrate.

4. The RF system of claim 1, wherein the first direction is perpendicular to the second direction.

5. The RF system of claim 1, further comprising a first power divider, coupled to the first RF processing module and the antenna strings of the first group.

* * * * *